United States Patent [19]

O'Reilly et al.

[11] Patent Number: 5,302,141

[45] Date of Patent: Apr. 12, 1994

[54] COMPATIBLE TRAILER CONNECTING

[75] Inventors: Michael O'Reilly; Dana P. Scribner, West Groton, both of Mass.

[73] Assignee: Cole Hersee Company, South Boston, Mass.

[21] Appl. No.: 979,847

[22] Filed: Nov. 23, 1992

[51] Int. Cl.⁵ .......................................... H01R 13/64
[52] U.S. Cl. .................................................. 439/680
[58] Field of Search ............... 439/677, 678, 679, 680, 439/681

[56] References Cited

U.S. PATENT DOCUMENTS

| | | | |
|---|---|---|---|
| 3,008,116 | 11/1961 | Blanchenot | 439/680 |
| 3,601,660 | 8/1971 | Brandt et al. | 317/99 |
| 3,915,476 | 10/1975 | Burkle | 280/442 |
| 3,953,099 | 4/1976 | Wilson | 439/677 |
| 4,249,125 | 2/1981 | Carver | 324/51 |
| 4,405,190 | 9/1983 | Schroeder | 339/28 |
| 4,460,811 | 7/1984 | Murr et al. | 200/51.03 |
| 4,669,791 | 6/1987 | Savill | 439/34 |
| 4,711,510 | 12/1987 | Orlando, Jr. | 439/246 |
| 4,770,644 | 9/1988 | Feder | 439/166 |
| 4,842,532 | 6/1989 | Krause | 439/174 |
| 4,846,697 | 7/1989 | Rodgers | 439/35 |

FOREIGN PATENT DOCUMENTS 2248268  4/1974  Fed. Rep. of Germany ...... 439/680

Primary Examiner—P. W. Echols
Attorney, Agent, or Firm—Fish & Richardson

[57] ABSTRACT

A socket connector which can accommodate a first plug connector or a second plug connector has a cylindrical cavity with a first plurality of socket contacts and a second plurality of socket contacts. The second plurality of socket contacts are shorter than the first plurality of socket contacts. The first plug connector has a number of plug contacts arranged for mating engagement with both the first plurality of socket contacts and the second plurality of socket contacts. The second plug connector contains a number of plug contacts arranged only for mating engagement with the first plurality of socket contacts. The socket connector is constructed and arranged so as to allow penetrating travel of the first plug connector fully into the cylindrical cavity so as to engage with the plug contacts the first plurality of socket contacts and the second plurality of socket contacts while limiting penetrating travel of the second plug connector into the cylindrical cavity to a point at which the plug contacts engage the first plurality of socket contacts but the second plurality of socket contacts are neither engaged nor contacted by the second plug connector.

19 Claims, 6 Drawing Sheets

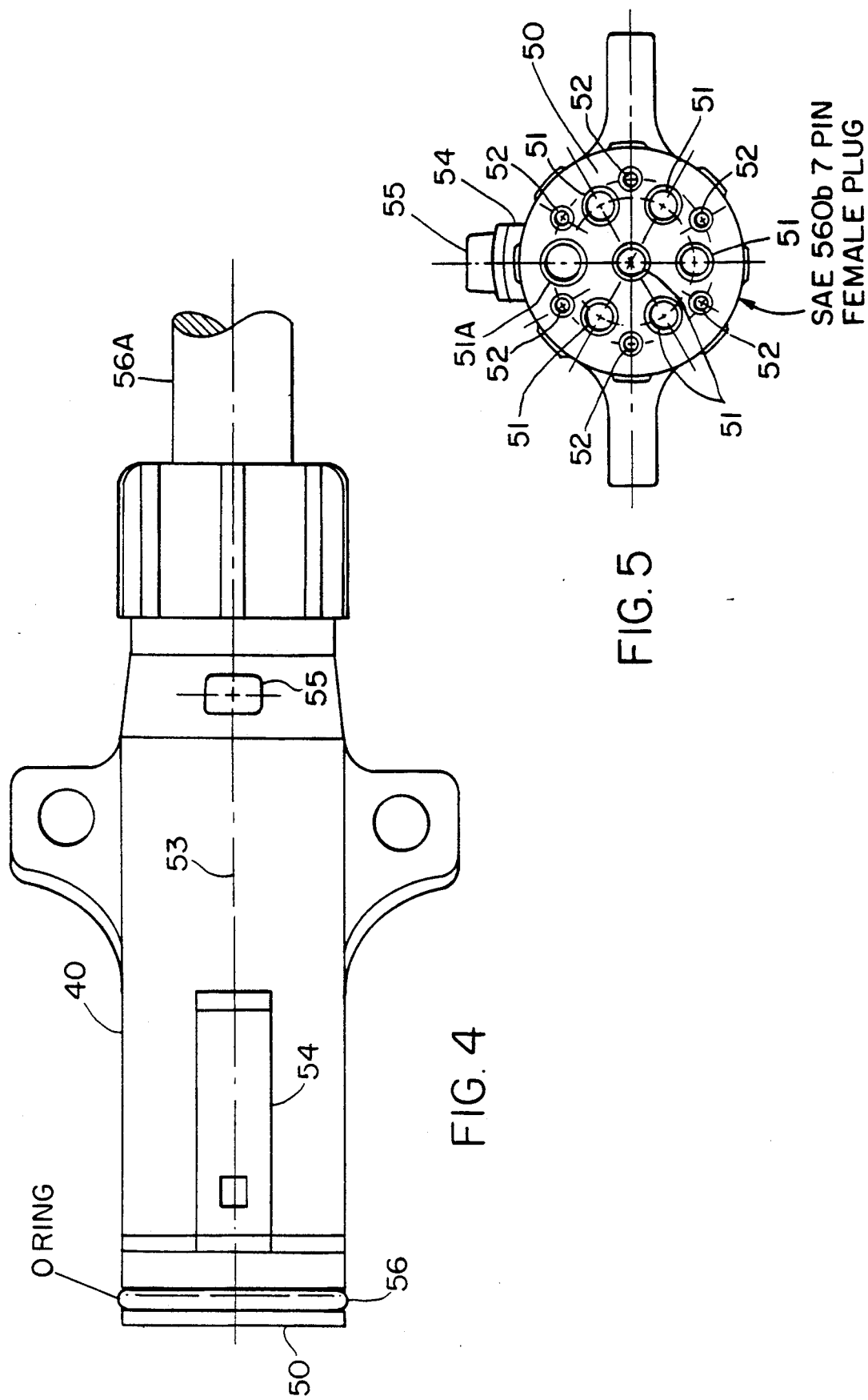

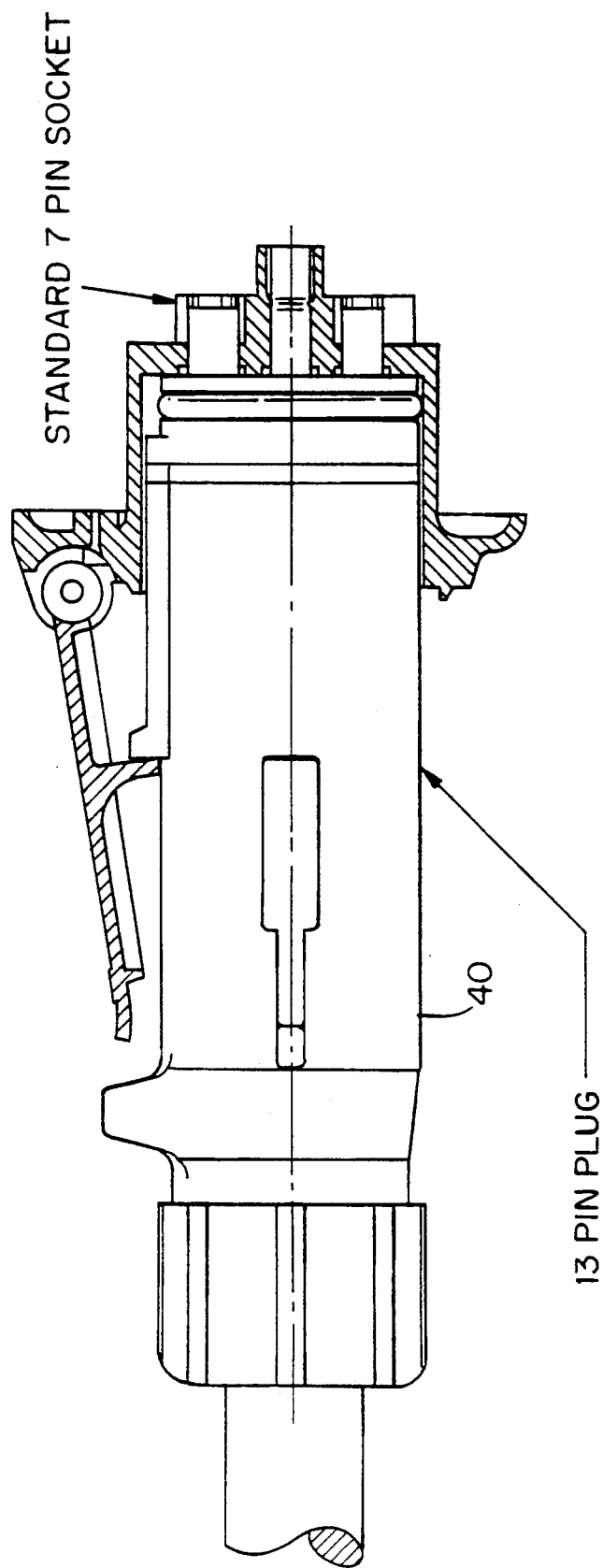

COMPATIBLE TRAILER CONNECTING

The invention relates generally to making electrical connections between the tractor and the trailer of a tractor-trailer rig, and more particularly concerns connecting that is compatible with connectors having first and second different numbers of contacts, typically seven and 13.

A standard connector presently used within the industry is a seven-conductor connector; i.e., a connector capable of connecting seven separate circuits. Present sizing and geometric standards are set forth as SAE J560b, in "Seven- Truck-Trailer Jumper Cable," 1992 SAE Handbook, p. 2:20.137. Another standard connector is capable of interconnecting 13 circuits.

Generally speaking a connector has two primary parts, a receptacle socket, or female, connector and a cable plug, or male, connector. The socket, or female connector has within its cavity a plurality of metal contact pins, or male contacts. The cable plug, or male, connector has within its terminal end a plurality of small, cylindrical, metal cavities, or female contacts. The plug connector is inserted into the cavity of the socket connector and the pins of the socket connector fit into the female contacts within the plug connector, thereby completing the various electrical circuits wired to the connector.

A preliminary novelty search of subclasses 34-36, 51, 144 and 501 of class 439 uncovered U.S. Pat. Nos. 3,601,660, 3,915,476, 4,249,125, 4,405,190, 4,460,811, 4,669,791, 4,770,644, 4,792,308 and 4,846,697. U.S. Pat. No. 4,842,532 discloses a compatible connector with offset portions carrying additional connections.

In the trucking industry, one particular tractor may pull many different trailers at different times; and one particular trailer may be pulled by many different tractors at different times. It is therefore highly likely that a tractor equipped with a seven-conductor socket connector will sometimes couple to a trailer equipped with a 13-conductor plug connector; or that a tractor equipped with a 13-conductor socket will couple to a trailer equipped with a seven-conductor plug.

It is accordingly an important object of this invention to provide a socket connector and a plug connector each containing a first number of contacts, such as 13, greater than a second number of contacts, such as seven, but each of which maintains interconnecting compatibility with a plug or socket connector, respectively, having the second number of contacts.

According to the invention, there is a socket connector which can accommodate a first plug connector having a first array of a first plurality of contacts or a second plug connector having a second array of a second plurality of contacts different from said first plurality. The socket connector has a cylindrical cavity having the first plurality of contacts arranged in a pattern that mates with the first plurality of contacts in the first plug connector and the second plurality of contacts arranged in a pattern that mates with the pattern of the second plurality of contacts in the second plug connector. The socket connector is constructed and arranged to allow penetrating travel of the first plug connector fully into the cylindrical cavity so as to engage both the first plurality of contacts and the second plurality of contacts while limiting penetrating travel of the second plug connector into the cylindrical cavity to a point at which the first plurality of contacts are engaged but the second plurality of contacts are free from engagement and contact with the second plug connector. Typically, the first plurality of contacts form a pattern with a first of the contacts coaxial with the axis of the cylindrical cavity and the remaining ones of the latter contacts positioned equidistant from and symmetrically disposed about the cylindrical cavity axis, typically equiangularly spaced about the cylindrical axis.

Other features, objects and advantages will become apparent from the following detailed description when read in connection with the accompanying drawings in which:

FIG. 4 is a top view of the plug connector according to the invention;

FIG. 5 is an end view of the plug connector according to the invention, showing the female contacts;

FIG. 9 shows the plug connector of the invention engaging a seven-pin socket connector.

Figure 2:
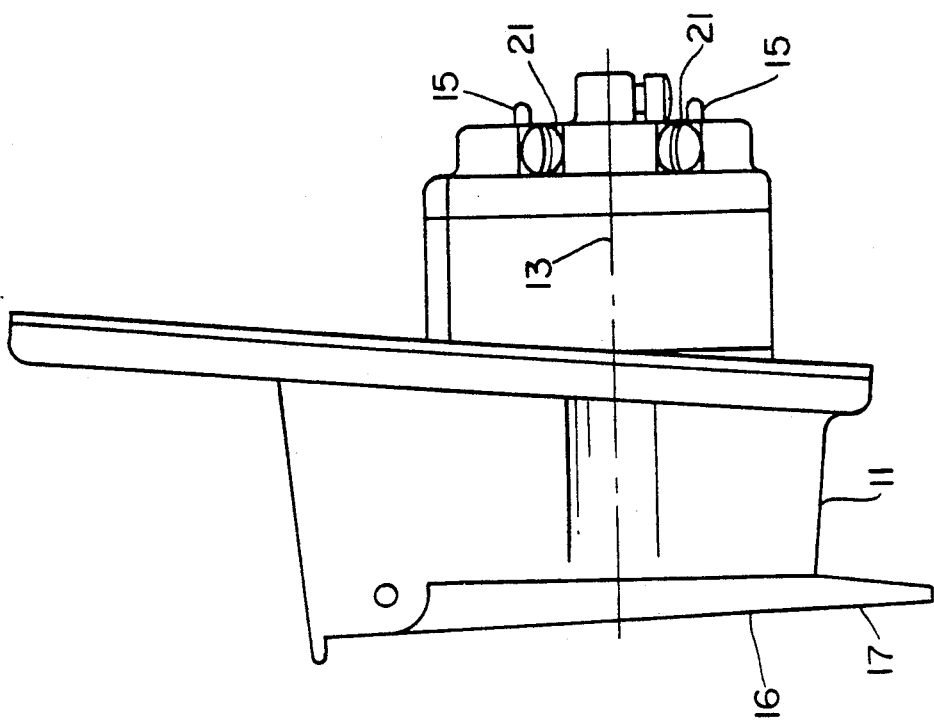
FIG. 2 is a side view of the socket connector according to the invention, with the cover closed.
Figure 1:
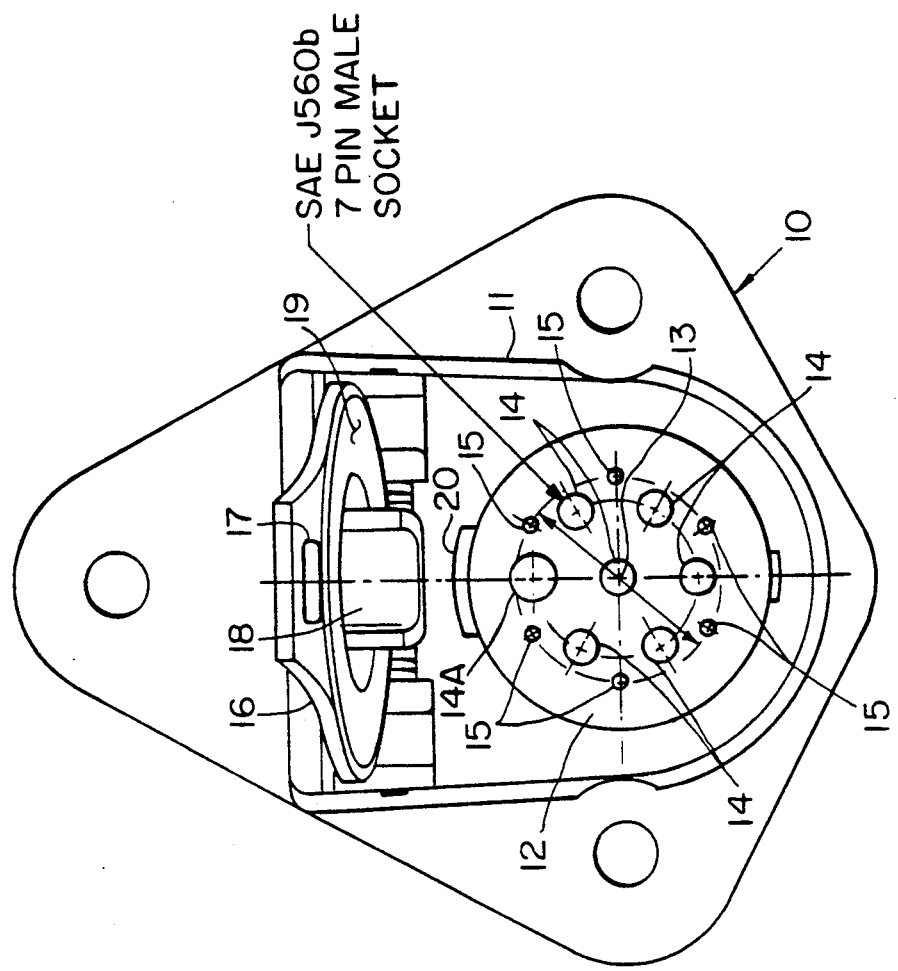
FIG. 1 is an end view of a socket connector according to the invention looking into the cavity with the cover opened, showing the male contact pins.

With reference now to the drawing, and more particularly to FIGS. 1, 2, 6, and 7, there is shown in FIG. 1 an end view of an embodiment of socket connector 10 of the invention containing thirteen male contact pins. Socket connector 10 has a housing 11 with a cylindrical cavity 12. Located within and projecting from the rear of cavity 12 are thirteen male contact pins positioned circumferentially about, and parallel to, axis 13 of cavity 12. Seven standard pins 14 are positioned in a standard pattern as set forth by SAE J560b, i.e., a central pin surrounded by six pins spaced equiangularly from each other and from axis 13 of cavity 12. Per the SAE J560b standard, the pin 14A located at the 12 o'clock position in FIG. 1 is slightly larger in diameter than the rest of standard pins 14. Also located within cavity 12 and projecting from the rear of the cavity 12 are six supplemental male contact pins 15 positioned circumferentially about and parallel to axis 13 of cavity 12. Supplemental male contact pins 15 are of smaller diameter and project a shorter distance than standard male contact pins 14. Supplemental male contact pins 15 are positioned equidistant from axis 13 of cavity 12 just outside standard male contact pins 14. Supplemental male contact pins 15 are positioned angularly between standard male contact pins 14. Wiring from the various circuits is connected at the rear of socket connector 10 to standard male contact pins 14 using set screws 21, or directly to the supplemental male contact pins 15 using commercially available female connectors (not shown).

Socket connector 10 has a cover 16, spring biased towards the closed position. Cover 16 has a latch slot 17 and a latch-tab 18. Gasket 19 seals cavity 12 when cover 16 is in the closed position. An indexing key slot 20, which is a shallow, narrow channel in the wall of cavity 12, runs parallel to axis 13 of cavity 12. Indexing key slot 20 does not extend to the rear of cavity 12.

Figure 3:
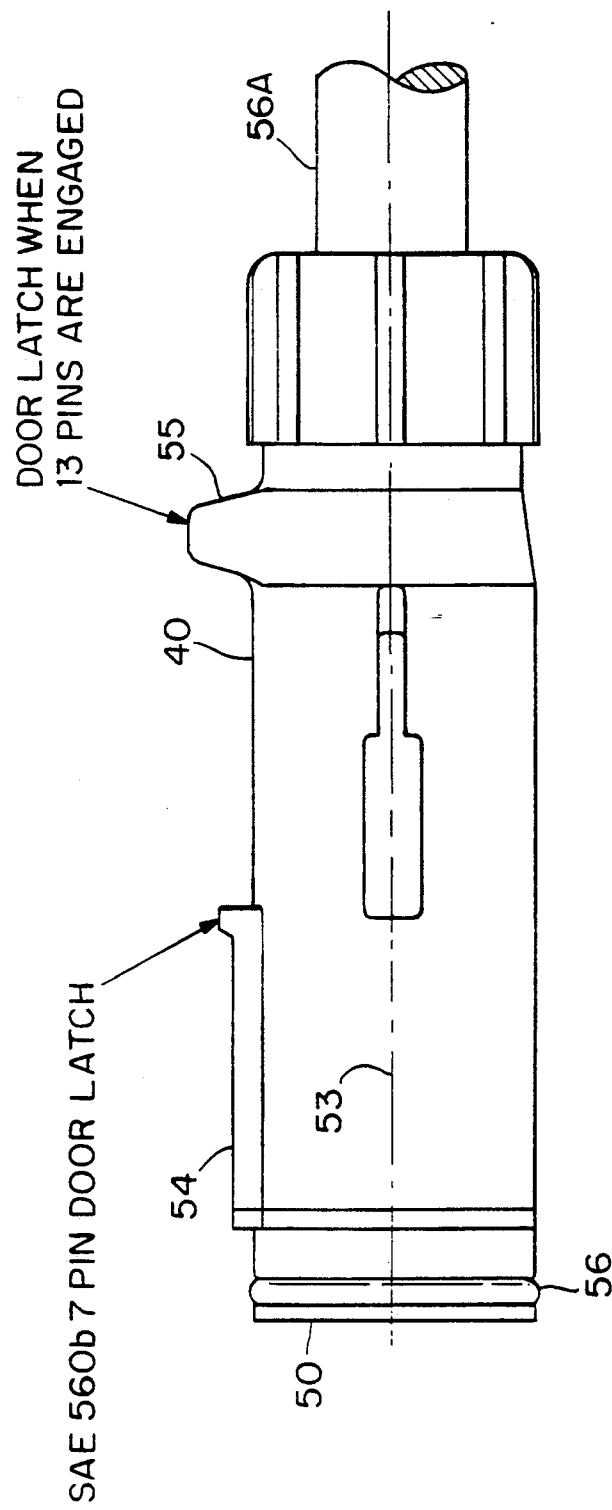
FIG. 3 is a side view of the plug connector according to the invention.

Referring now to FIGS. 3-5, plug connector 40 of the invention is shown. Plug connector 40 comprises a cylindrical housing. Terminal insulator surface 50 of plug connector 40 has a pattern of portals containing the female contacts. Seven standard female contacts 51 are positioned in a standard pattern as set forth by SAE J560b; i.e., a central contact surrounded by six contacts positioned angularly about axis 53 of plug connector 40 spaced equiangularly from each other and from axis 53 of plug 40. Per SAE J560b, female contact 51A located at the 12 o'clock position in FIG. 5 is slightly larger in diameter than the rest of standard female contacts 51. Six supplemental female contacts 52 are positioned circumferentially about axis 53 of plug 40 equidistant from axis 53 just outside the circle of standard female contacts 51, and angularly between the circle of standard female contacts 51. Supplemental female contacts 52 are of a smaller diameter than standard female contacts 51.

At the 12 o'clock position in FIG. 5, there is shown an indexing key 54 which runs axially along plug connector 40 from a position slightly aft of terminal surface 50 to a point approximately midway along axis 53 of plug 40. There is also a latch post 55, circumferentially located at the same position as indexing key 54 and toward the end of the plug opposite the terminal insulator surface 50. 0-ring 56 is located slightly behind terminal insulator surface 50, in an annular groove on the exterior surface of plug 40.

Plug 40 is constructed so that wiring from the various circuits to be connected, contained within a thirteen-conductor cable 56A, enters plug 40 at the rear of the plug, and is affixed to the female contacts 51, 52.

Figure 6:
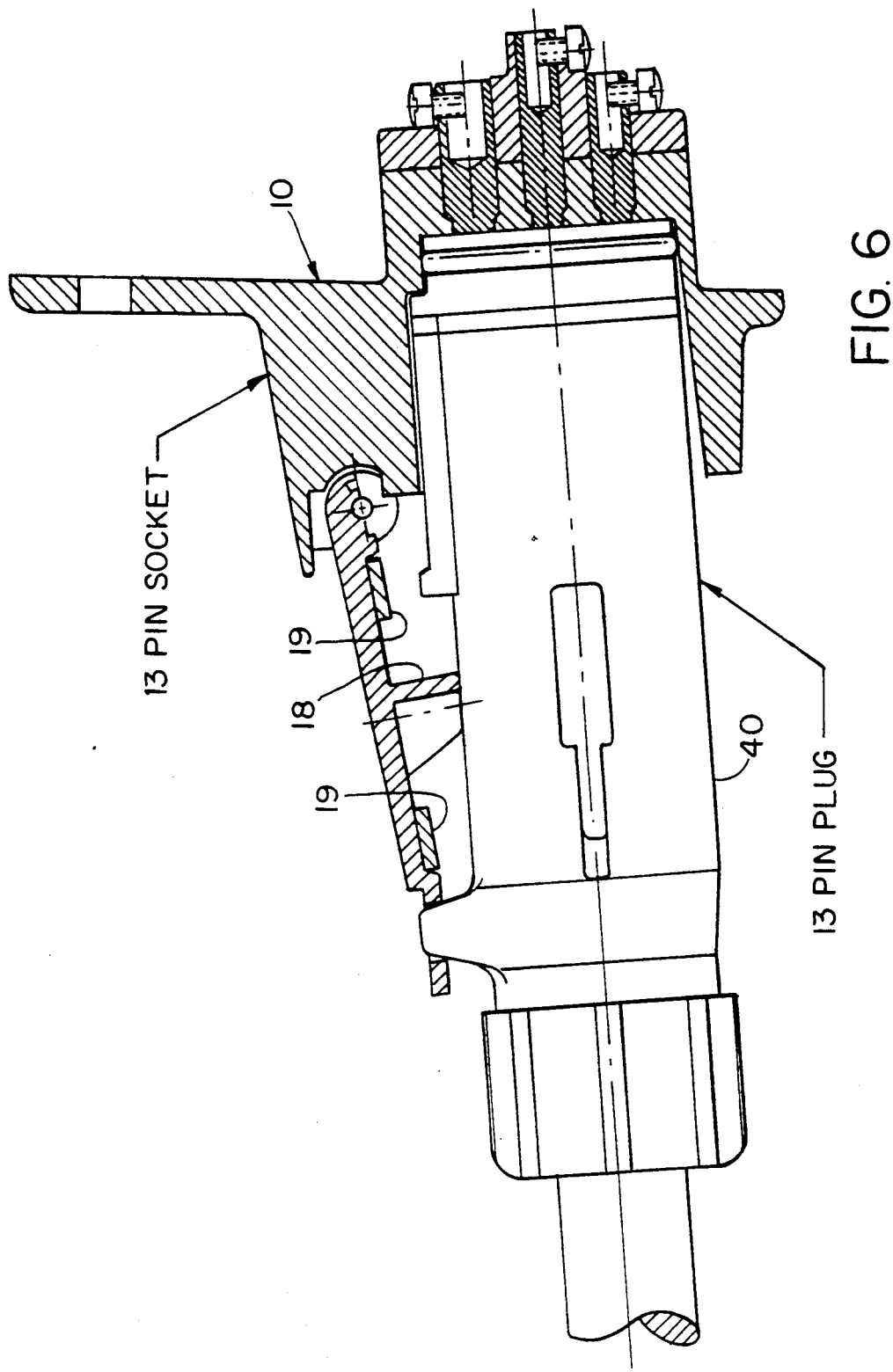
FIG. 6 shows the plug connector of the invention engaging the socket connector of the invention.
Figure 7:
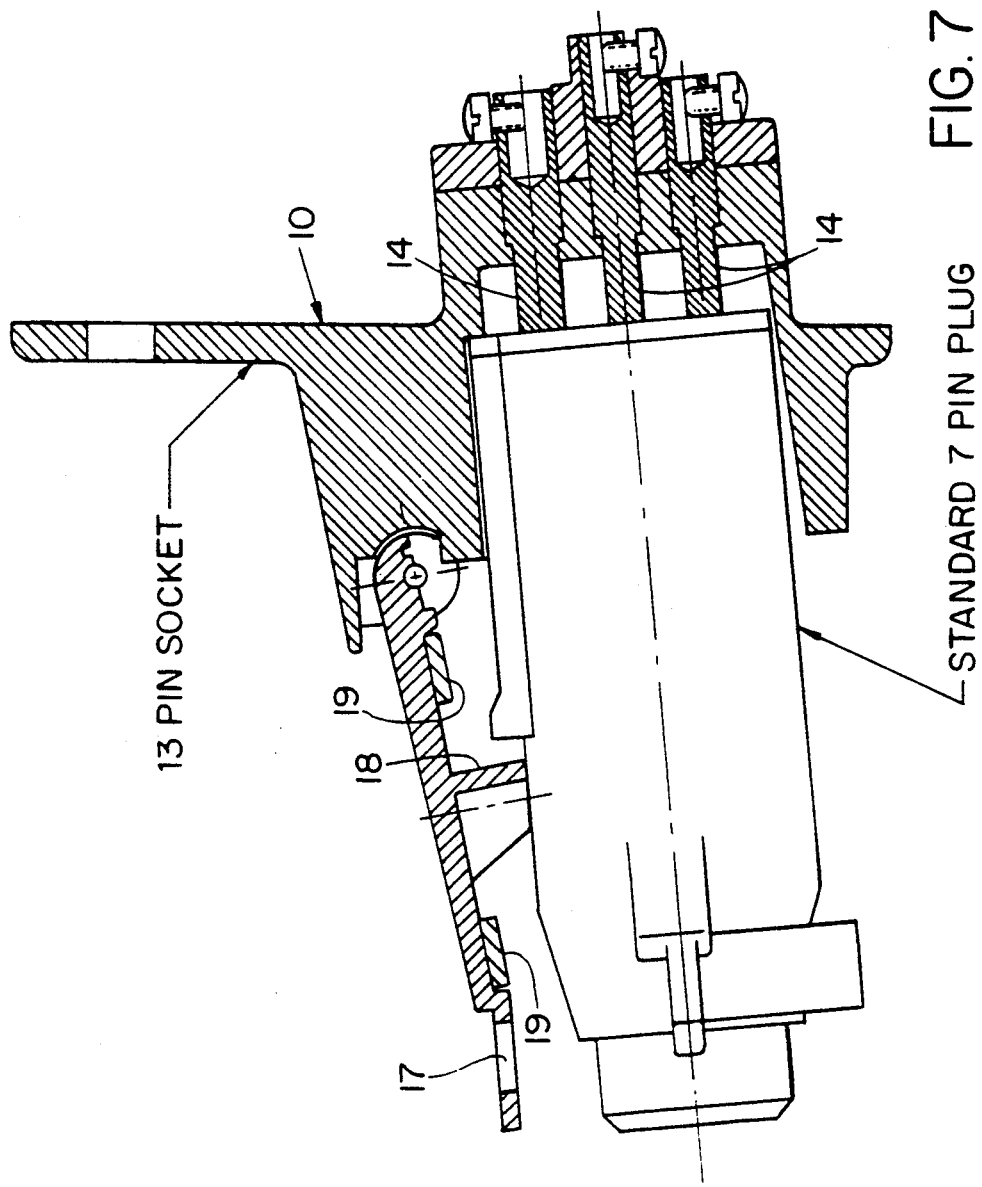
FIG. 7 shows a seven-pin plug connector engaging the socket connector of the invention.

Referring now to FIGS. 6-8, the use of the invention may be seen. FIG. 6, shows plug connector 40 of the invention used in conjunction with socket connector 10 of the invention. Cover 16 is held open, and plug 40 is positioned so that indexing key 54 is aligned with indexing key slot 20, and plug 40 enters cavity 12 of socket connector 10. Because indexing key 54 does not extend to terminal surface 50 of plug 40, plug 40 can slide fully into the cavity 12, with terminal surface 50 of plug 40 contacting the rear of cavity 12. Standard female contacts 51 fully engage standard male contact pins 14, and supplemental female contacts 52 fully engage supplemental male contact pins 15. Latch slot 17 latches over latch post 55, thereby securing plug connector 40 within socket connector 10.

FIG. 7 shows an SAE J560b standard seven-pin plug connector used in conjunction with socket connector 10 of the invention. Because the indexing key on a standard SAE J560b plug connector extends to the terminal insulator surface of the plug, and because indexing key slot 20 of socket connector 10 of the invention does not extend to the rear of cavity 12, a standard seven-pin plug connector can enter cavity 12 only to the point at which the indexing key of the plug abuts the end of indexing key slot 20 of socket connector 10 of the invention. This feature prevents the terminal insulator surface of the standard seven-pin plug connector from contacting and crushing supplemental male contact pins 15, which are not shown in FIG. 7. Because standard male contact pins 14 are longer than supplemental male contact pins 15, the seven female contacts within the standard plug can engage standard male contact pins 14. Latch tab 18 engages the plug connector behind the indexing key, thereby securing the standard plug connector within socket connector 10.

FIG. 8 shows plug connector 40 of the invention used in conjunction with a standard SAE J560b seven-pin socket connector. Plug connector 40 fully enters the cavity of the standard socket connector, such that terminal insulator face 50 of plug connector 40 abuts the rear surface of the cavity. Standard female contacts 51 engage the seven male contact pins of the standard socket connector. A latch tab on the cover of the standard socket connector engages the rear of indexing key 54, thereby securing plug connector 40 in the standard socket connector.

There has thus been described a novel electrical connector consisting of a plug connector and a mating socket connector, each having more electrical contacts than an analogous standard connector, but each being matingly compatible with the corresponding mating standard connector having fewer electrical contacts. It is evident that those skilled in the art may now make numerous uses and modifications of and departures from the specific embodiment described herein without departing from the inventive concepts. Consequently, the invention is to be construed as embracing each and every novel feature and novel combination of features present in or possessed by the apparatus and techniques herein described and limited solely by the spirit and scope of the amended claims.

What is claimed is:

1. A socket connector which can accommodate a first plug connector having a first array of plug contacts or a second plug connector having a second array of plug contacts, said socket connector comprising, a cylindrical cavity with a first plurality of socket contacts, and a second plurality of socket contacts, said second plurality of contacts being shorter than said first plurality of contacts, said first array of plug contacts arranged for mating engagement with both said first plurality of socket contacts and said second plurality of socket contacts, said second array of plug contacts arranged only for mating engagement with said first plurality of socket contacts, said socket connector constructed and arranged so as to allow penetrating travel of said first plug connector fully into said cylindrical cavity so as to engage with said first array of plug contacts said first plurality of socket contacts and said second plurality of socket contacts, while limiting penetrating travel of said second plug connector into said cylindrical cavity to a point at which said second array of plug contacts engage said first plurality of socket contacts, but said second plurality of socket contacts are neither engaged nor contacted by said second plug connector.

2. The socket connector of claim 1 wherein said first plurality of socket contacts form a pattern wherein one of said socket contacts is coaxial with the axis of said cylindrical cavity and the remaining ones of said first plurality of socket contacts are positioned equiangularly about said axis of said cylindrical cavity, and said second plurality of socket contacts are positioned equidistant from said axis of said cylindrical cavity and angularly positioned between said remaining ones of said first plurality of socket contacts.

3. The socket connector of claim 1 wherein said first plurality is seven, and said second plurality is six.

4. The socket connector of claim 3 and further comprising a cavity cover and an indexing key slot, said cavity cover constructed and arranged so as to engage and retain said first plug connector or said second plug connector when said first plug connector or said second plug connector is inserted into said cylindrical cavity, thereby preventing disengagement of said first plug connector or said second plug connector from said socket connector, said indexing key slot constructed and arranged so as to position properly said first plug connector or said second plug connector within said cylindrical cavity for mating engagement with at least one of said first and second plurality of contacts.

5. A socket connector in accordance with claim 3 and further comprising said first plug connector seated in said socket connector with said first plurality of plug contacts engaging said first plurality of socket contacts and said second plurality of plug contacts engaging said second plurality of socket contacts.

6. The socket connector of claim 2 wherein said first plurality is seven, and said second plurality is six.

7. The socket connector of claim 6 and further comprising a cavity cover and an indexing key slot, said cavity cover constructed and arranged so as to engage and retain said first plug connector or said second plug connector when said first plug connector or said second plug connector is inserted into said cylindrical cavity, thereby preventing disengagement of said first plug connector or said second plug connector from said socket connector, said indexing key slot constructed and arranged so as to position properly said first plug connector or said second plug connector within said cylindrical cavity for mating engagement with at least one of said first and second plurality of contacts.

8. A socket connector in accordance with claim 6 and further comprising said first plug connector seated in said socket connector with said first plurality of plug contacts engaging said first plurality of socket contacts and said second plurality of plug contacts engaging said second plurality of socket contacts.

9. A socket connector in accordance with claim 2 and further comprising said first plug connector seated in said socket connector with said first plurality of plug contacts engaging said first plurality of socket contacts and said second plurality of plug contacts engaging said second plurality of socket contacts.

10. The socket connector of claim 2 and further comprising a cavity cover and an indexing key slot, said cavity cover constructed and arranged so as to engage and retain said first plug connector or said second plug connector when said first plug connector or said second plug connector is inserted into said cylindrical cavity, thereby preventing disengagement of said first plug connector or said second plug connector from said socket connector, said indexing key slot constructed and arranged so as to position properly said first plug connector or said second plug connector within said cylindrical cavity for mating engagement with at least one of said first and second plurality of contacts.

11. The socket connector of claim 1 and further comprising a cavity cover and an indexing key slot, said cavity cover constructed and arranged so as to engage and retain said first plug connector or said second plug connector when said first plug connector or said second plug connector is inserted into said cylindrical cavity, thereby preventing disengagement of said first plug connector or said second plug connector from said socket connector, said indexing key slot constructed and arranged so as to position properly said first plug connector or said second plug connector within said cylindrical cavity for mating engagement with at least one of said first and second plurality of contacts.

12. A socket connector in accordance with claim 1 and further comprising said first plug connector seated in said socket connector with said first plurality of plug contacts engaging said first plurality of socket contacts and said second plurality of plug contacts engaging said second plurality of socket contacts.

13. A plug connector which can accommodate a first socket connector having a first array of socket contacts or a second socket connector having a second array of socket contacts, said plug connector comprising, a cylindrical body with a first plurality of plug contacts, and a second plurality of plug contacts, said first array of socket contacts arranged for mating engagement with both said first plurality of plug contacts and said second plurality of plug contacts, said second array of socket contacts arranged only for mating engagement with said first plurality of plug contacts, said plug connector constructed and arranged so as to be able to penetrate fully into either said first socket connector or said second socket connector thereby engaging all said socket contacts in said first socket connector or all said socket contacts in said second socket connector, whereas a different plug connector would be limited in penetrating said first socket connector to a point at which only said first plurality of socket contacts is engaged.

14. The plug connector of claim 13 wherein said first plurality of plug contacts form a pattern wherein one of said plug contacts is coaxial with the axis of said plug connector, and the remaining ones of said first plurality of plug contacts are positioned equiangularly about said axis of said plug connector, and said second plurality of plug contacts are positioned equidistant from said axis of said plug connector and equiangularly positioned between said remaining ones of said first plurality of plug contacts.

15. The plug connector of claim 14 wherein said first plurality is seven, and said second plurality is six.

16. The plug connector of claim 14 and further comprising a cavity cover and an indexing key slot, said cavity cover constructed and arranged so as to engage and retain said first plug connector or said second plug connector when said first plug connector or said second plug connector is inserted into said cylindrical cavity, thereby preventing disengagement of said first plug connector or said second plug connector from said socket connector, said indexing key slot constructed and arranged so as to position properly said first plug connector or said second plug connector within said cylindrical cavity for mating engagement with at least one of said first and second plurality of contacts.

17. The plug connector of claim 13 wherein said first plurality is seven, and said second plurality is six.

18. The plug connector of claim 17 and further comprising a cavity cover and an indexing key slot, said cavity cover constructed and arranged so as to engage and retain said first plug connector or said second plug connector when said first plug connector or said second plug connector is inserted into said cylindrical cavity, thereby preventing disengagement of said first plug connector or said second plug connector from said socket connector, said indexing key slot constructed and arranged so as to position properly said first plug connector or said second plug connector within said cylindrical cavity for mating engagement with at least one of said first and second plurality of contacts.

19. The plug connector of claim 13 and further comprising a cavity cover and an indexing key slot, said cavity cover constructed and arranged so as to engage and retain said first plug connector or said second plug connector when said first plug connector or said second plug connector is inserted into said cylindrical cavity, thereby preventing disengagement of said first plug connector or said second plug connector from said socket connector, said indexing key slot constructed and arranged so as to position properly said first plug connector or said second plug connector within said cylindrical cavity for mating engagement with at least one of said first and second plurality of contacts.

* * * * *